United States Patent [19]

Sharpe

[11] Patent Number: 4,634,276
[45] Date of Patent: Jan. 6, 1987

[54] SLIT IMAGING SYSTEM USING TWO CONCAVE MIRRORS

[75] Inventor: Michael R. Sharpe, Cambridge, England

[73] Assignee: U.S. Philips Corporation, New York, N.Y.

[21] Appl. No.: 620,784

[22] Filed: Jun. 14, 1984

[30] Foreign Application Priority Data

Jun. 15, 1983 [GB] United Kingdom ............... 8316269

[51] Int. Cl.[4] .......................... G01J 3/18; G02B 5/10
[52] U.S. Cl. .................................. 356/305; 350/619; 356/328; 356/334
[58] Field of Search ............... 350/619; 356/305, 326, 356/228, 331–334

[56] References Cited

U.S. PATENT DOCUMENTS 2,797,609 7/1957 White ............................... 356/331
3,575,511 4/1971 Francis ............................. 356/331

Primary Examiner—F. L. Evans
Attorney, Agent, or Firm—Paul R. Miller

[57] ABSTRACT

Configurations of optical systems using two concave mirrors to image an off-axis slit are used advantageously in monochromators or spectrographs in which the coma produced by one mirror is cancelled by that produced by the other mirror. However, such systems produce a curved line image of a straight line slit. This curvature is substantially removed in a two concave mirror optical system in which the off-axis angle and the separation 2L between the mirrors are chosen so that the principal ray $OP_1$ from the center of the line object to the first mirror and the principal ray $P_2I$ from the second mirror to the center of the line image are both substantially perpendicular to an axis of symmetry of the optical system which passes through the centers of curvature $C_1$, $C_2$ of the two concave mirrors. The image line is then curved in a plane normal to the image plane and appears substantially straight in the image plane.

10 Claims, 12 Drawing Figures

SLIT IMAGING SYSTEM USING TWO CONCAVE MIRRORS

This invention relates to an optical system comprising two concave mirrors for imaging a line object placed off-axis with respect to a first one of the mirrors as a line image off-axis with respect to the second one of the mirrors. Such a system may be used advantageously in various optical instruments, for example in monochromators or spectrographs, and in particular for a diffraction grating spectrograph using a photodiode array detector. One advantage of such a system is that, using mirrors, the system may be used over a wider range of wavelengths than if transmissive optical components had been used.

It is well known that when a concave spherical mirror is used to image an object, particularly in such a manner that the principal ray has a finite angle of incidence at the mirror, then an aberrated image of the object is obtained. The aberrations of mirror systems are described by J. E. Stewart in "Infrared Spectroscopy", Marcel Dekker, New York, 1970. The primary aberrations concerned are spherical aberration, coma and astigmatism.

Figure 1:
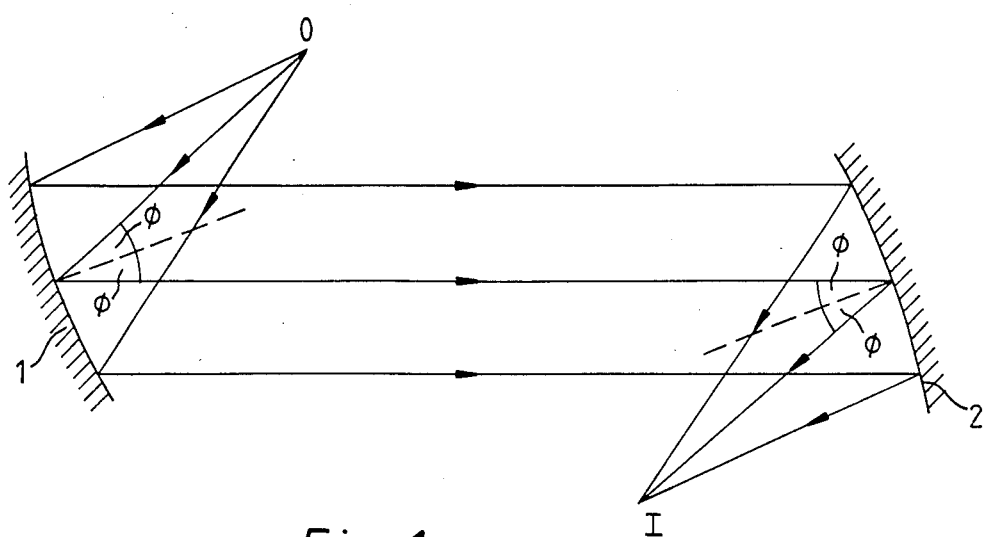

It is also well known that a combination of two concave spherical mirrors can be used to cancel out the effects of coma, particularly if two identical mirrors are used, orientated in an asymmetrical manner with a collimated beam between the two mirrors, as illustrated in FIG. 1 of the accompanying drawings. This system is described by Stewart in the book mentioned above on page 70.

If a point object is placed at the tangential focal point of one mirror, so that the light rays from the object form a collimated beam, then the image at the tangential focal point of the other mirror approximates to an astigmatic tangential line image, with some broadening due to spherical aberration. The primary coma is cancelled by the asymmetrical positioning of the mirrors. If the system is used to image a line object which is placed at the tangential focal point of one mirror, the line being at right angles to the tangential plane, then each point on the line is imaged as an astigmatic line image (with some spherical aberration) in the tangential image plane of the other mirror.

Figure 3:
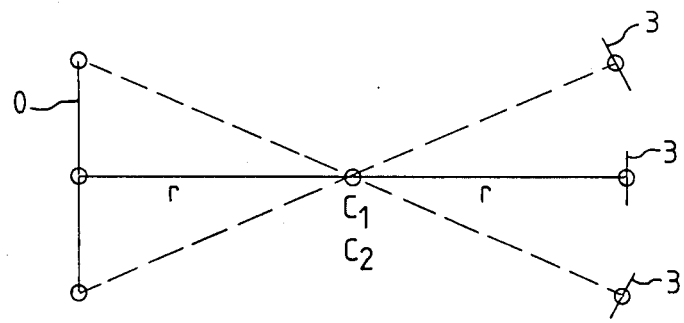
Figure 2:
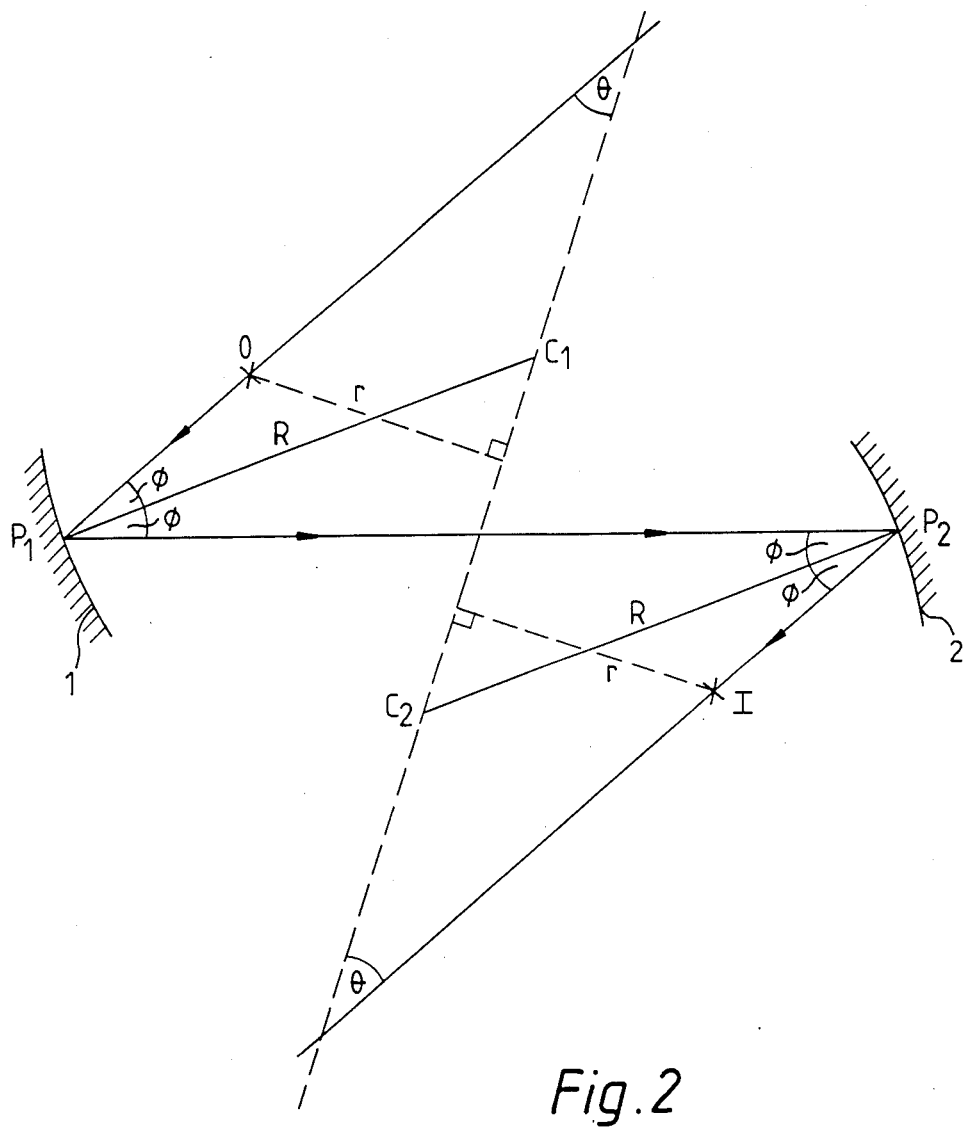

The system has an axis of symmetry with respect to the spheres forming the mirror surfaces. This axis lies along the line joining the centers of curvature of the two spheres. This is illustrated in FIG. 2 as $C_1 C_2$. Each point on the object slit is imaged as an astigmatic line image at right angles to the radius joining the object point and its image in a view along the axis of the system, as shown in FIG. 3. Because the astigmatic line images are at an angle to the image line they curve and broaden the image of the object slit as seen along the symmetry axis. Thus, in an image plane at right angles to the principal ray from the pole of the second or focussing mirror to the center of the line image, the image will appear curved and broadened. It is an object of the invention to provide a configuration of the two concave mirror optical system such that image curvature and broadening are reduced over prior art arrangements.

The optical system is characterised in that the off-axis angle and the separation between the mirrors are chosen so that the principal ray from the center of the line object to the first mirror and the principal ray from the second mirror to the center of the line image are both substantially perpendicular to an axis of symmetry of the optical system which passes through the centers of curvature of the two concave mirrors. Plane mirrors may be used to fold the system. In this event the above condition of orthogonality of the principal rays to the axis of symmetry is that which is evident in the unfolded system.

Use is made of the astigmatic properties of this off-axis optical system if the line object is in the tangential focal plane of the first concave mirror and if the line image is observed in the tangential focal plane of the second concave mirror. The line object and the line image may be normal to the tangential plane of the first and second mirrors respectively and these tangential planes may be in a common plane.

An optical system in accordance with the invention may be characterised in that the concave mirrors are each of radius of curvature R at their poles and in that the separation S between the poles of the two concave mirrors is given by the expression:

$$S = 2R \frac{\cos \phi}{\cos 2\phi}$$

where $\phi$ is the common off-axis angle of the principal rays of object and image.

An optical system in accordance with the invention may be characterised in that the mirrors are spherical.

The invention may be incorporated in a monochromator of the Czerny-Turner type. This monochromator comprises an entrance slit, a concave collimating mirror, a concave focusing mirror, a wavelength dispersing element in the collimated beam between the collimating and focusing mirrors and an exit slit, characterized in that the two concave mirrors constitute an optical system as above. This monochromator can be modified by providing that the optical path length between the poles of the concave mirrors differs from the value S by an amount sufficient to produce a straight line image at one wavelength at a non-zero diffraction order. The wavelength dispersing element comprises a diffraction grating on the reflecting surface of the focusing mirror;

The invention may be incorporated in a spectrograph comprising a spectral line detector. The spectrograph comprises a monochromator and the spectral line detector in which the monochromator comprises the construction discussed above;

In such a spectrograph the detector may be a planar array of linear detectors parallel to one another where the linear detectors are parallel to the image of the entrance slit, and where the value of S for the one wavelength images the entrance slit onto one of the detectors in the array.

Figure 4:
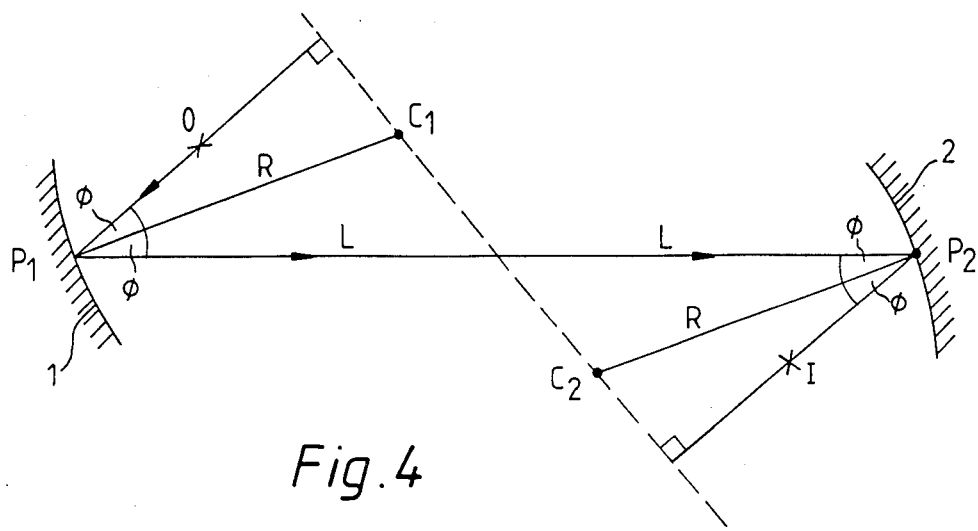
Figure 9:
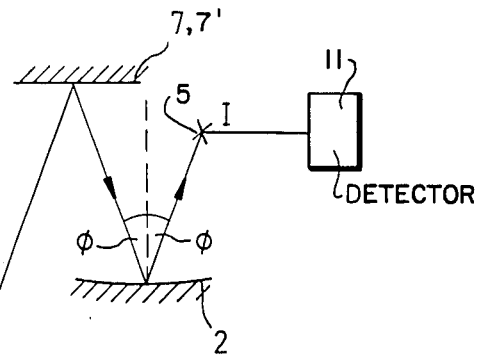
Figure 9:
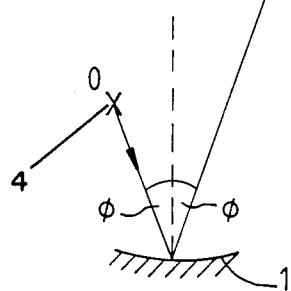
Figure 9A:
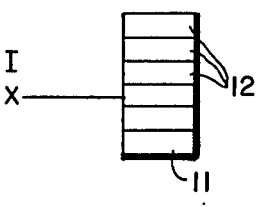
Figure 5:
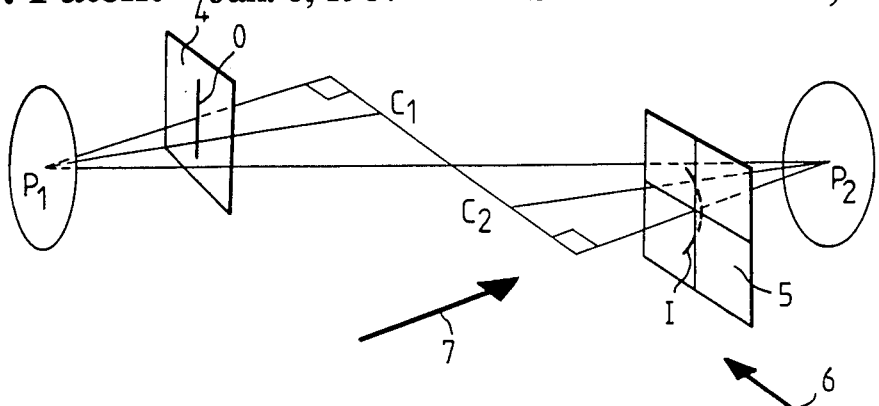
Figure 6:
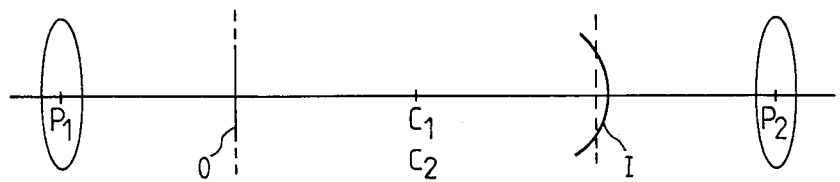
Figure 7:
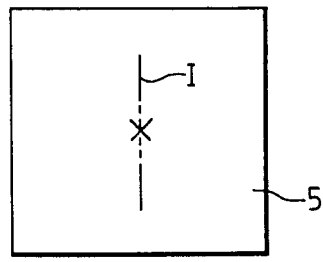
Figure 8:
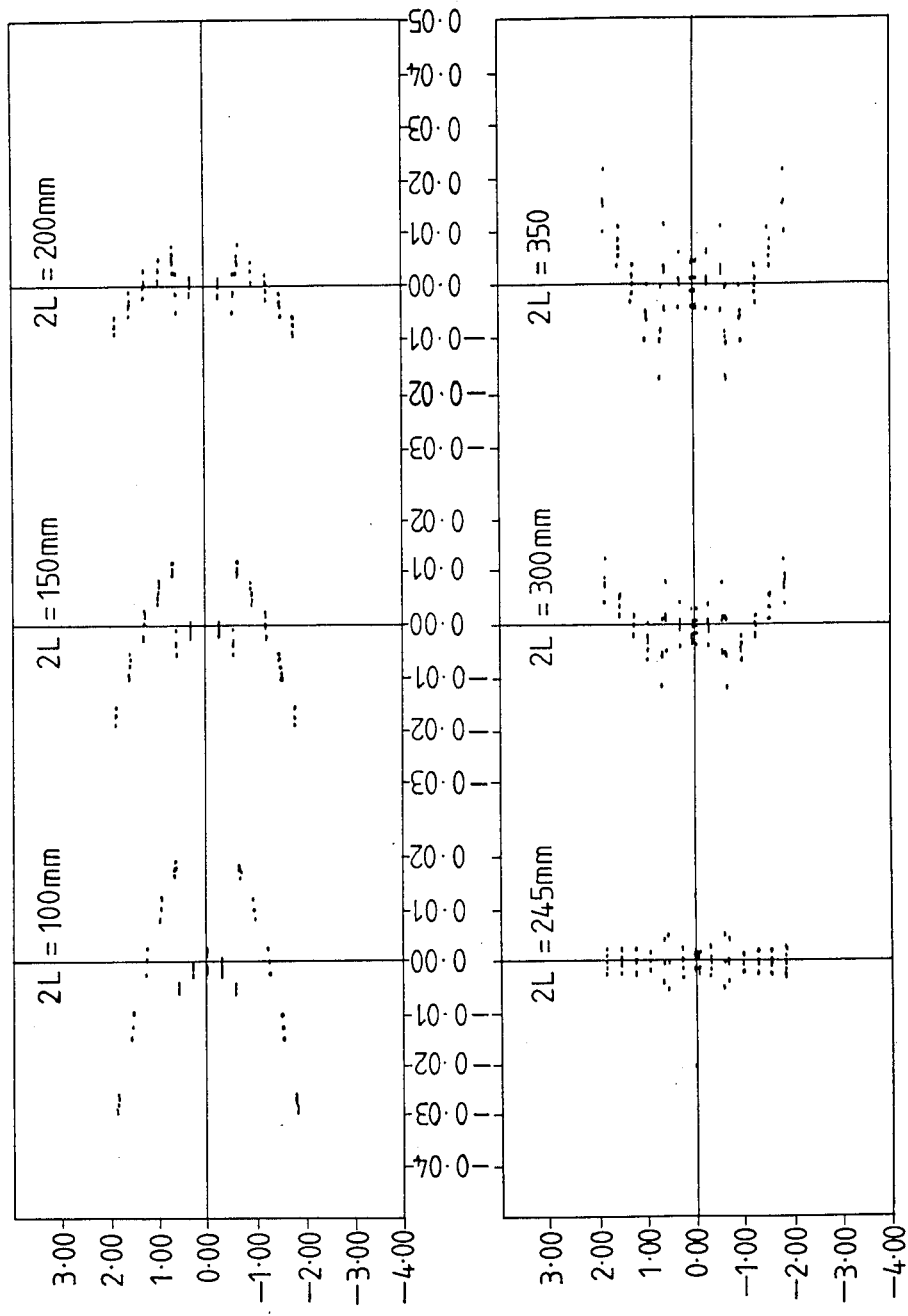
Figure 10:
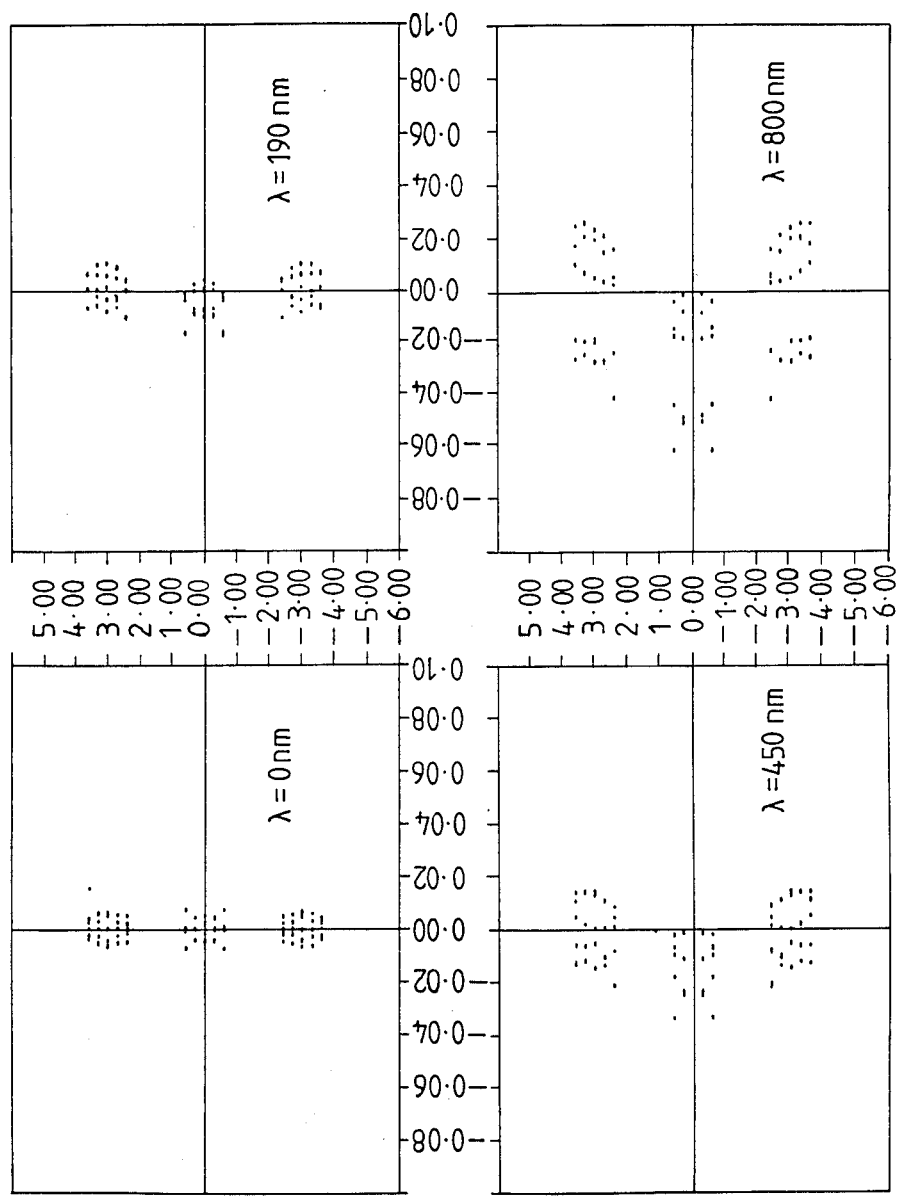
Figure 11:
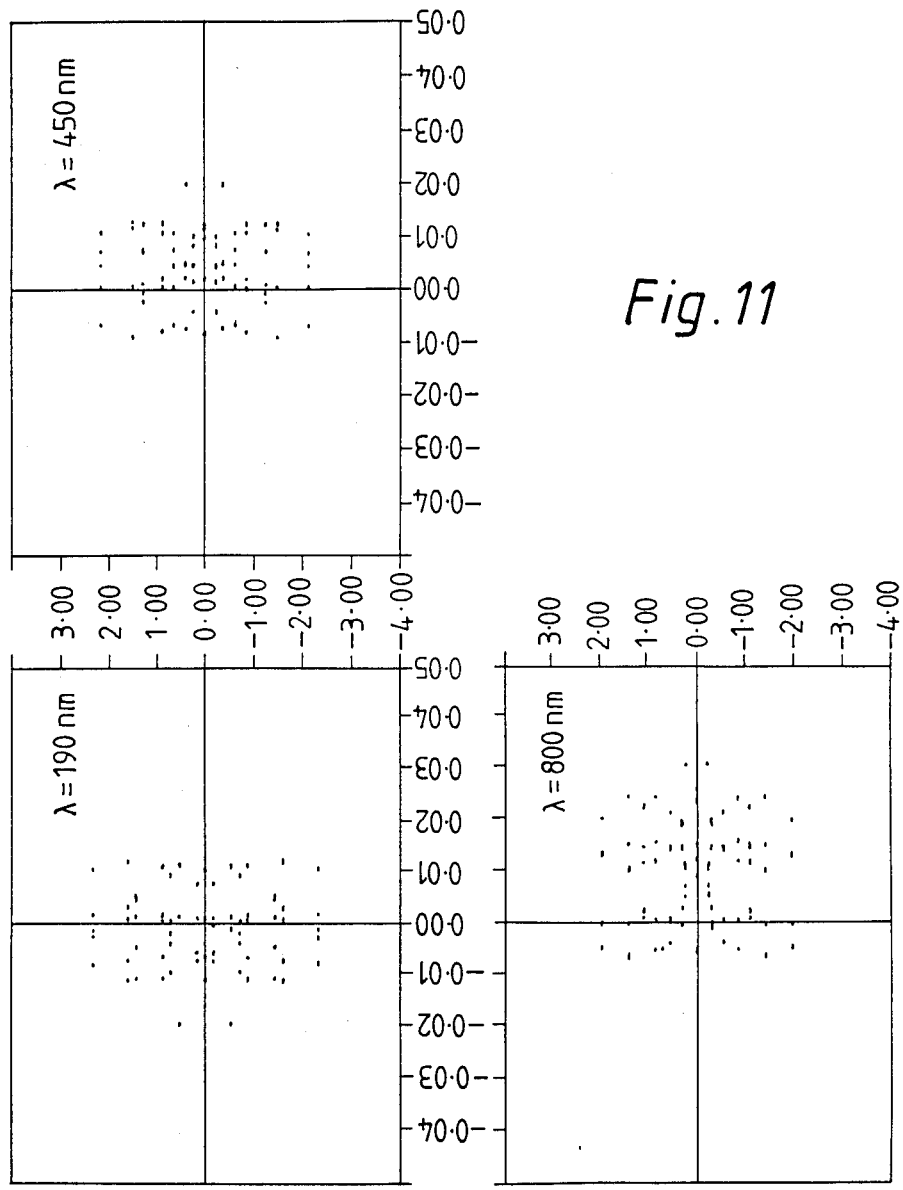

Embodiments of the invention will now be described with reference to the accompanying drawings in which:

FIG. 1 shows a known optical system in which the coma produced by one spherical mirror is cancelled out by the coma of a second spherical mirror, FIG. 2 shows the optical system of FIG. 1 with principal rays and axis of symmetry, FIG. 3 shows a view of the optical system of FIG. 2 looking along the axis of symmetry, FIG. 4 shows an optical system in accordance with the present invention, FIG. 5 shows a perspective view of the optical system of FIG. 4, FIG. 6 shows a view of the optical system of FIG. 4 looking along the axis of symmetry, FIG. 7 shows a view of the image plane in FIG. 4 looking along the principal ray to the center of the image, FIG. 8 shows computer calculated line image shapes as a function of mirror separation in the system of FIG. 4, FIG. 9 shows a monochromator or spectrograph system using a plane diffraction grating, FIG. 9A shows a line detector for the spectrograph system of FIG. 9, FIG. 10 shows computer calculated line image shapes as a function of wavelength in a monochromator using an optical system in accordance with the invention, and FIG. 11 shows computer calculated line image shapes as a function of wavelength in a spectrograph using an optical system in accordance with the invention.

Referring to FIG. 1 there is shown a known optical system comprising two concave spherical mirrors 1 and 2 of equal radius of curvature used to image a point object 0, at an off-axis angle $\phi$, as an image I at the same off-axis angle $\phi$, but on the opposite side of the beam between the mirrors from the object 0. The beam between the mirrors is collimated. It is well known that in such a system the coma produced by mirror 1 is cancelled out by mirror 2. This system is described by J. E. Stewart in the book "Infrared Spectroscopy" published by Marcel Dekker, New York, 1970 on page 70. In FIG. 1 the meridian or tangential plane of the off-axis object 0 is the plane containing the optical axis of the mirror 1 and the off-axis object point 0 and is the plane of the drawing in FIG. 1. Likewise the tangential plane of the image I is also the plane of the drawing and is co-incident with that of the object. In FIG. 2 $P_1$ is the pole of mirror 1, $C_1$ its center of curvature and the plane 0 $P_1$ $C_1$ is the tangential plane. Likewise plane I $P_2$ $C_2$ is the image tangential plane. Mirrors 1 and 2 have a common radius of curvature R.

If the point object 0 is placed at the tangential focal point of mirror 1, so that the light rays from the object form a collimated beam, then the image at the tangential focal point of mirror 2 approximates to an astigmatic tangential line image normal to the tangential plane, with some broadening due to spherical aberration. The primary coma has been cancelled by the asymmetrical positioning of the mirrors.

If the system is used to image a line object which is placed at the tangential focal point of one mirror, the line being at right angles to the tangential plane, i.e. at right angles to the plane of the Figure then each point on the line is imaged as an astigmatic line image (with some spherical aberration) in the tangential image plane of the other mirror. In FIG. 3 the line images are shown at 3. The system has an axis of symmetry with respect to the spheres forming the mirror surfaces. This axis lies along the line joining the centers of curvature of the two spheres. This is illustrated in FIG. 2 as $C_1$ $C_2$. Each point on the object line is imaged as an astigmatic line image at right angles to the radii r joining the object and image in a view along the axis of the system, as shown in FIGS. 2 and 3. Because the astigmatic line images are at an angle to the image line they broaden the whole image as seen along the symmetry axis. When observed along the line of the principal reflected ray in the image, the width of the line image is reduced by a factor $\cos 0$, where 0 is the angle between the system symmetry axis and the principal reflected ray of the image, as shown in FIG. 2. Consequently if $0=90°$, then the astigmatic line broadening will be reduced to zero, and the width of the line image will principally be determined by the spherical aberration.

FIG. 4 shows an optical system in accordance with the invention arranged so that 0 equals 90°. If the distances between the centers of the two mirrors is 2L, then from the geometry of FIG. 4, if $0=90°$ it follows that:

$$L = R \frac{\cos \phi}{\cos 2\phi} \qquad (1)$$

Where
R = radius of curvature of both mirrors, and
$\phi$ = angle of incidence of principal rays on the mirrors.

The optical situation is illustrated in the perspective drawing of FIG. 5. The line object 0 is shown in an object plane 4 normal to the common tangential plane $C_1$ $P_1$ $P_2$ $C_2$ and at the tangential focal point of the mirror. The object 0 is imaged as a curved and broadened line I, intersecting an image plane 5. FIG. 6 shows a view 6 of the system along the axis of symmetry $C_1$ $C_2$ showing the full curvature of the image line. FIG. 7 shows a view 7 at right angles to view 6 and normal to the image plane 5. The line image as projected onto the image plane 5 appears substantially straight. Thus, a straight line object produces a straight line image as is desired in many optical instruments. The effectiveness of this optical configuration can be verified by computer ray tracing. FIG. 8 shows the intersection of computed ray traces in the image plane of the system at right angles to the principal ray. The following parameters were used:

Mirror radii of curvature R = 100 mm
Incident angle $\phi = 20°$
Object line length = 2.5 mm.

Three points were taken on the object, one at the center and one at each end. The aperture stop for the system has been placed symmetrically halfway between the two mirrors, and is an aperture 5 mm square. Vertical scale intervals are 1.0 mm and horizontal scale intervals are 0.01 mm. The above equation (1) requires that the distance between the two mirrors 2L should be 245 mm.

FIG. 5 shows how the astigmatic line curvature broadening is reduced when 2L = 245 mm, and a straight line image is obtained, the width of which can be accounted for by spherical aberration.

One application for this invention is to monochromators and spectrographs.

FIG. 9 shows the same optical configuration as shown in FIG. 4, except that one beam has been reflected by a plane mirror 7 introduced between the two concave mirrors 1 and 2. The plane mirror 7 folds the optical system, reducing its overall size. The condition of orthogonality of the principal rays to the axis of symmetry still applies to the unfolded system. The unfolded system is obtained by viewing the virtual image of mirror 2 and the image I as seen in the plane mirror 7. In like manner any number of plane mirror folds may be made in the optical path between the object and the image without losing the benefit of the orthogonality condition in accordance with the invention. Any such system will therefore also image a straight line object as a straight line image.

If the plane mirror is replaced by a diffraction grating 7', and slits 5, 4 are placed at the image and object positions, the configuration becomes that of a monochromator of the Czerny-Turner type (see page 203 of Stewarts' book mentioned previously). When the angles of incidence and diffraction at the grating are equal, the zero order wavelength setting, the diffraction grating acts as a mirror and a straight narrow entrance slit is imaged as a straight narrow image at the exit slit. When the grating is rotated on its axis so that the monochromator transmits a given wavelength, the grating will introduce some subsidiary coma because the anamorphism of the grating gives rise to a difference in width between the incident and diffracted light beams. Some spectral line curvature is also introduced. However these effects are comparatively small and the slit image remains substantially a straight line.

The advantage of using this type of monochromator is that whereas most monochromators require curved entrance and/or exit slits to obtain an image of the entrance slit coincident with the exit slit, this monochromator can use straight entrance and exit slits, which are much easier to manufacture and align. Also for a spectrograph, as further seen in FIG. 9 with detector 11, spectra can be recorded with straight spectral lines, which are easier to measure and interpret.

One apparent disadvantage is that the optical path length of a monochromator or spectrograph using an optical system in accordance with the invention is larger than usual. However, as indicated above, plane folding mirrors may be used to obtain a desired overall size for the instrument.

One application where the advantage of being able to use straight slits greatly outweighs the disadvantages of larger size, is for a spectrograph with a photodiode array detector 11, as shown in FIG. 9A. These diode arrays may, for example, consist of a linear array of silicon photodiodes 12 pitched at intervals of 25 microns and each 2.5 mm in length. The array is placed at the focal plane of a spectrograph, each diode being shaped as a straight slit, 25 microns wide, to receive a small band of wavelengths. As each diode acts as a straight exit slit, it is advantageous to have a spectrograph which produces a straight image of a straight entrance slit. Because of the very small dimensions of the photodiode arrays, a very small spectrograph is required to produce the wavelength coverage required by many instruments, and so even if the dimensions of the spectrograph are several times the focal length of the mirrors, the whole instrument will still have relatively small dimensions.

The flatness of the focal plane across the array, and the linearity of the wavelength dispersion across the focal plane can be optimised by varying the path length between the diffraction grating and the mirror 2 which focusses the light onto the array while maintaining the principal rays at right angles to the axis of symmetry in accordance with the invention.

FIG. 10 shows some computer ray traces for a monochromator designed according to the invention. The monochromator parameters are as follows:
Mirror radius of curvature R=350 mm
Mirror principal ray incident angle $\phi$=10°
Collimating mirror to grating distance L=366.8 mm
Grating to focussing mirror distance L=366.8 mm
Angle between grating incident & diffracted beams=20°
Entrance slit length=6 mm In FIG. 10 the vertical scale intervals are 1.0 mm and the horizontal scale intervals are 0.02 mm. The system aperture stop is at the grating and is 20 mm square. The ray traces are for three equally spaced points on the slit. FIG. 10 shows that at 0 nm when the grating is equivalent to a plane mirror, a good straight line focus is obtained. As the wavelength increases, the aberrations increase, and the grating also causes the slit image to be slightly curved, but taking the scales of the ray trace into account, even at 800 nm the image is still straight enough for some instruments. The wavelength dispersion of the monochromator is about 0.1 nm of wavelength for 0.02 mm scale interval, so that at 800 nm, the total width of the slit image is about 0.08 mm corresponding to 0.4 nm. If the image is a uniformly illuminated patch the limiting bandwidth of the monochromator will be equivalent to about ¼ of the width of the image, which is about 0.1 nm at 800 nm. For comparison an Ebert monochromator of the same focal length and aperture and with curved slits has a limiting bandwidth of about 0.05 nm.

FIG. 11 shows some computer ray traces for a spectrograph designed to use a photodiode array as a detector. The dimensions of the spectrograph are as follows:
Mirror radius of curvature R=140 mm
Collimating mirror principal ray incident angle $\phi$=22.42°
Collimating mirror to grating distance 2L-X=292.5 mm
Principal ray grating incident angle=17.0°
Grating to focussing mirror distance X at 190 nm=72.6 mm
Focussing mirror principal ray incident angle $\phi$ at 190 nm=22.42°
Entrance slit length=2.5 mm In FIG. 11 the vertical scale intervals are 1.O mm and the horizontal scale intervals are 0.01 mm.

The system aperture stop is at the grating and 9 mm wide and 12 mm high. The system has been optimised according to the invention at a wavelength of 190 nm and uses a grating with 300 lines/mm. The reciprocal dispersion of the spectrograph is about 50 nm per mm. It can be seen that at all wavelengths shown the slit image is essentially straight. At 800 nm the patch width is therefore about 0.03 mm corresponding to 1.5 nm, giving a limiting bandwidth of about 0.4 nm. The width of the array elements is 0.025 mm, which is equivalent to about 1.2 nm. Hence the effective bandwidth of the spectrograph is about 1.2 nm plus 0.4 nm equaling 1.6 nm.

It should be appreciated that the theory of optical aberrations, in particular the Seidel theory, is an approximate theory which ignores terms of higher order. It is therefore very difficult to make an exact analysis of most optical systems except by computer ray tracing. The use of the system described to form a straight line image when constructed to dimensions given by equation (1) gives a good approximation to a straight line image. Systems constructed with the dimension L slightly different from that calculated will also give a performance adequate for some applications. It should be noted that by using separations of the two mirrors either side of the value given by equation 1, curvature of one sign or the other can be deliberately given to the line image. In particular when the invention is used in a monochromator or spectrograph it may sometimes be advantageous to use a system with the dimension L slightly different from that given by equation (1) to compensate for the aberrations of the diffraction grating at a particular wavelength or to compensate for curvature of the spectral line introduced by the grating.

A spectrograph in accordance with the invention could use detectors other than a diode array, for example a photographic plate, a vidicon tube, or an image dissector tube.

Equivalent systems using the principle according to the invention could be constructed using aspheric mirrors, toroidal, parabolic or ellipsoidal mirrors, for example.

FIG. 9 shows a plane mirror 7 introduced between the spherical mirrors 1 and 2. As indicated previously this plane mirror can be a plane reflection grating 7' in a monochromator or spectrograph. This additional reflecting surface may be avoided by laying down the diffraction grating on the curved surface of the focussing mirror 2. Such gratings may be of the ruled type or may be of the interference type, sometimes known as the holographic type.

I claim:

1. An optical system comprising two concave mirrors for imaging a line object placed off-axis with respect to a first one of said two mirrors as a line image being off-axis with respect to a second one of said two mirrors, characterized in that the off-axis angle $\phi$ and the radius of curvature R of each of said two mirrors are chosen so that the separation S between the poles of said two concave mirrors is given by the expression:

$$S = 2R \frac{\cos \phi}{\cos 2\phi},$$

and in that the principal ray from the center of said line object to said first one of said two mirrors and the principal ray from said second one of said two mirrors to the center of said line image are both substantially perpendicular to an axis of symmetry passing through centers of curvature of said two concave mirrors.

2. An optical system according to claim 1, wherein said line object is in the tangential focal plane of said first one of said two concave mirrors, and wherein said line image is in the tangential focal plane of said second one of said two concave mirrors.

3. An optical system according to claim 1, wherein said line object is normal to said tangential focal plane of said first one of said two concave mirrors, and said line image is normal to said tangential focal plane of said second one of said two concave mirrors.

4. An optical system according to claim 1 or claim 2 or claim 3, wherein said two concave mirrors are spherical.

5. An optical system according to claim 1 or claim 2 or claim 3, wherein said two concave mirrors are aspheric mirrors.

6. A monochromator comprising an entrance slit, a concave collimating mirror, a concave focusing mirror, a wavelength dispersing element in the collimated beam between said collimating mirror and said focusing mirror, and an exit slit, characterized in that said collimating mirror images a line object placed off-axis at said entrance slit, and said focusing mirror focuses images of said line object as a line image at said exit slit, said line image being off-axis, in that the off-axis angle $\phi$ and radius of curvature R of each of said collimating mirror and said focusing mirror are chosen so that the separation S between the poles of said collimating mirror and said focusing mirror is given by the expression:

$$S = 2R \frac{\cos \phi}{\cos 2\phi},$$

and in that the principal ray from the center of said line object to said collimating mirror and the principal ray from said focusing mirror to the center of said line image are both substantially perpendicular to an axis of symmetry passing through centers of curvature of said collimating mirror and said focusing mirror.

7. A monochromator according to claim 6, wherein the optical path length between poles of said collimating mirror and said focusing mirror differs from said separation S by an amount sufficient to produce a straight line image at one wavelength in a non-zero diffraction order.

8. A monochromator according to claim 6 or claim 7, wherein said wavelength dispersing element comprises a diffraction grating opposite the reflecting surface of said focusing mirror.

9. A spectrograph comprising a monochromator including an entrance slit, a concave collimating mirror, a concave focusing mirror, a wavelength dispersing element in the collimated beam between said collimating mirror and said focusing mirror, and an exit slit, characterized in that said collimating mirror images a line object placed off-axis at said entrance slit, and said focusing mirror focuses images of said line object as a line image at said exit slit, said line image being off-axis, in that the off-axis angle $\phi$ and radius of curvature R of each of said collimating mirror and said focusing mirror are chosen so that the separation S between the poles of said collimating mirror and said focusing mirror is given by the expression:

$$S = 2R \frac{\cos \phi}{\cos 2\phi},$$

and in that the principal ray from the center of said line object to said collimating mirror and the principal ray from said focusing mirror to the center of said line image are both substantially perpendicular to an axis of symmetry passing through centers of curvature of said collimating mirror and said focusing mirror; and a spectral line detector.

10. A spectrograph according to claim 9, wherein said spectral line detector is a planar array of linear detectors parallel to one another, wherein said linear detectors are parallel to said image of said entrance slit, and wherein said separation S for one wavelength images said entrance slit onto one of said linear detectors.

* * * * *

UNITED STATES PATENT AND TRADEMARK OFFICE
CERTIFICATE OF CORRECTION

PATENT NO. : 4,634,276
DATED : Jan 6, 1987
INVENTOR(S) : Michael R. Sharpe

It is certified that error appears in the above-identified patent and that said Letters Patent is hereby corrected as shown below:

Column 2, line 43, change "mirror;" to --mirror.--

Column 2, line 48, change "above;" to --above.--

Column 3, line 66, change "cos 0" to --cos θ--

Column 3, line 67, change "0" to --θ --

Column 4, line 1, change "0=90°" to --θ =90°--

Column 4, line 6, change "0" to --θ--

Column 4, line 8, change "0=90°" to --θ =90°--

Signed and Sealed this

First Day of December, 1987

Attest:

DONALD J. QUIGG

Attesting Officer

Commissioner of Patents and Trademarks